US008720616B2

(12) United States Patent
Kofoed et al.

(10) Patent No.: US 8,720,616 B2
(45) Date of Patent: May 13, 2014

(54) WHEELED OBJECT OF THE TYPE ADAPTED TO BE OPERATED BY A WALKING PERSON

(75) Inventors: Henrik Nøhr Kofoed, Espergaerde (DK); Mogens Ilsted Bech, Birkerød (DK); Kristina Nielsen, Copenhagen V (DK); Jesper Moe Jensen, Roskilde (DK); Amir Shahar, Dragør (DK); Lars Thøgersen, Copenhagen S (DK); Christian Ruegaard Hansen, Copenhagen Ø (DK)

(73) Assignee: Borringia Industrie AG, Ettingen (CH)

( * ) Notice: Subject to any disclaimer, the term of this patent is extended or adjusted under 35 U.S.C. 154(b) by 1013 days.

(21) Appl. No.: 11/720,357

(22) PCT Filed: Nov. 29, 2005

(86) PCT No.: PCT/IB2005/003578
§ 371 (c)(1), (2), (4) Date: Apr. 1, 2008

(87) PCT Pub. No.: WO2006/059200
PCT Pub. Date: Jun. 8, 2006

(65) Prior Publication Data
US 2009/0001740 A1 Jan. 1, 2009

(30) Foreign Application Priority Data
Dec. 1, 2004 (DK) ................................ 2004 01879

(51) Int. Cl.
*B60K 1/00* (2006.01)

(52) U.S. Cl.
USPC ............................... 180/15; 180/65.1; 180/13

(58) Field of Classification Search
USPC .......................... 180/19.1, 19.3, 65.1, 15, 11
See application file for complete search history.

(56) References Cited

U.S. PATENT DOCUMENTS 3,938,608 A 2/1976 Folco-Zambelli
5,083,625 A * 1/1992 Bleicher ..................... 180/65.1

(Continued)

FOREIGN PATENT DOCUMENTS

EP 0 329 504 8/1989
EP 0 630 637 A1 5/1994

(Continued)

*Primary Examiner* — Jeffrey J Restifo
*Assistant Examiner* — Erez Gurari
(74) *Attorney, Agent, or Firm* — Knobbe Martens Olson & Bear LLP

(57) ABSTRACT

A wheeled object or vehicle, such as a hospital bed (10) comprises a main chassis or frame (12) supported by a plurality of supporting wheels or rollers (11), which define the vertices of a polygonal supporting surface (21). The bed, which is usually moved by a walking person, is provided with at least one motor driven driving device (15), including at least one driving wheel or roller (18), positioned within said polygonal supporting surface. The driving device is rotatable about a substantially vertical axis (14) in relation to the chassis or frame so as to change the angular position of the driving wheel (18) in relation to the chassis or frame. Biasing means, such as a compression spring or a pneumatic or hydraulic cylinder (22, 34) is provided for biasing the driving device (15) in a direction away from the main chassis or frame (12) and towards the supporting surface (21). The biasing force is controlled such that the driving device (15) id kept in close non-skidding contact with the ground or floor surface (21) without lifting the supporting wheels (11) out or contact with the supporting surface.

19 Claims, 9 Drawing Sheets

(56) References Cited

U.S. PATENT DOCUMENTS

| | | | |
|---|---|---|---|
| 5,397,148 A | 3/1995 | Nelson | |
| 6,256,812 B1 * | 7/2001 | Bartow et al. | 5/86.1 |
| 6,390,213 B1 | 5/2002 | Bleicher | |
| 6,659,208 B2 * | 12/2003 | Gaffney et al. | 180/19.2 |
| 6,752,224 B2 | 6/2004 | Hopper et al. | |
| 6,752,244 B2 | 6/2004 | Sheppard et al. | |
| 6,877,572 B2 | 4/2005 | Vogel et al. | |
| 6,902,019 B2 | 6/2005 | Heimbrock et al. | |
| 7,284,626 B2 * | 10/2007 | Heimbrock et al. | 180/65.1 |
| 7,644,458 B2 * | 1/2010 | Foster et al. | 5/510 |
| 2003/0159861 A1 | 8/2003 | Hopper et al. | |
| 2003/0205420 A1 | 11/2003 | Mulhern et al. | |
| 2006/0169501 A1 | 8/2006 | Heimbrock et al. | |

FOREIGN PATENT DOCUMENTS

| | | |
|---|---|---|
| EP | 0 820 749 A1 | 7/1997 |
| GB | 2 094 727 A | 9/1982 |
| JP | 58-63575 | 4/1983 |
| JP | 61-158565 | 10/1986 |
| JP | 07-257387 | 10/1995 |
| JP | 09-286338 | 11/1997 |
| JP | 10-278802 | 10/1998 |
| JP | 2001-087315 | 4/2001 |
| JP | 2001-122123 | 5/2001 |
| JP | 2003-312480 | 11/2003 |

* cited by examiner

WHEELED OBJECT OF THE TYPE ADAPTED TO BE OPERATED BY A WALKING PERSON

BACKGROUND OF THE INVENTION

A large number of wheeled structures or "vehicles" are used to transport a variety of different items both inside and outside of houses. They vary from simple transport trolleys e.g. in production facilities over logistics equipment to hospital beds. A person, who takes on the function as a human engine, manually pushes by far the larger proportion of these vehicles.

When transporting heavy objects on a vehicle, the person pushing is exposed to severe physical strain both to initiate movement, to control the movement and in order to brake the vehicle as and when desired. For this reason a number of "assistive drive technologies" have been developed. Typically, such technologies help the person pushing the vehicle by supplying the force needed to propel the vehicle either forwards or backwards. The person normally supplies the steering force, by pushing directly onto the vehicle or onto a steering handle supplied.

Most of the vehicles have four wheels placed in a rectangular formation in order to give the vehicle stability. If traction—as known from many assistive drive systems—is supplied by motorizing e.g. the two rear wheels of the vehicle, the vehicle will have a pattern of movement similar to that of a car, which means that the vehicle needs a lot of space to manoeuvre, turn around corners etc. More importantly, moving such a vehicle sideways will involve "kerb side parking". Therefore, a number of assistive drive technologies have been developed, which supply force and traction to the drive surface via a fifth—often centre placed—wheel. These drive wheels, which are normally equipped with a reversible electric drive motor, are oriented in such a way that when the motor is activated they will supply the power needed in order to move the vehicle either forwards or backwards as desired. The advantage of such centre placed drive wheels is that the centre of the vehicle becomes the turning point of the vehicle, which again means that the vehicle requires less space to e.g. turn around a 90° corner.

Examples of such beds having a fifth centre placed driving wheel are disclosed in for example U.S. Pat. Nos. 6,877,572, 6,752,224, and 6,902,019.

However, the known centre placed assistive drive systems show a number of disadvantages, which the present invention overcomes, the most important ones being:

- As drive force is supplied only "along ships", the known systems do not help move the vehicles sideways. Actually, they may in some instances work against such movements.
- As the weight of the vehicle, even in its unloaded condition—for stability reasons—predominantly is carried by the four wheels in rectangular formation, it often becomes difficult for the drive wheel to obtain sufficient traction to move the vehicle when heavily loaded and/or when moving on an uneven drive surface.

SUMMARY OF THE INVENTION

Thus, the present invention provides motion assistance to a wheeled object of the type adapted to be operated by a walking person, such as a hospital bed, a stretcher or a similar wheeled object, and comprising a main chassis or frame supported by a plurality of supporting wheels or rollers, and a motor driven driving device engageable with a supporting surface for driving the wheeled object, the driving device being rotatable about a substantially vertical axis in relation to the chassis or frame so as to change the angular position and the driving direction of the driving wheel in relation to the chassis or frame. Such wheeled object according to the invention can be manoeuvred much more easily than the conventional beds described above without manual pushing and turning forces needed.

In principle, the driving device may be arranged at any suitable position in relation to the supporting wheels, and the driving device may be of any type. In the preferred embodiment, however, the motor driven driving device includes at least one driving wheel or roller positioned within a polygonal part of the supporting surface having vertices defined by the supporting wheels or rollers, preferably adjacent to the centre of the polygonal supporting surface part.

Thus, the present invention offers a new and improved centre placed assistive drive technology, which will allow the vehicle to be moved in any desired direction around the clock. Furthermore, as further described below, the wheeled object according to the invention may be equipped with a drive system, which secures that the driving device or driving wheel will always have the traction needed for the motor to move the vehicle even with a heavy load and/or possible unevenness of the supporting surface.

The supporting wheels or rollers preferably are of the swiveling caster wheel type or of the ball roller type movable in any direction. Furthermore, when used in the present specification and claims the term "driving wheel or roller" should be interpreted in its broadest sense so as to include also driving wheels or rollers not being in direct contact with the supporting surface, such as toothed wheels or rollers forming part of a belt drive, or any other propelling means.

Preferably, the driving device and the corresponding driving motor are arranged on a common sub-frame, which is rotatable about said substantially vertical axis in relation to the chassis or frame. Then, such sub-frame may be mounted on an existing conventional, non-motorised bed, stretcher or other wheeled object.

In order to allow a proper contact between the driving wheel and the supporting surface or floor surface the driving device may be mounted so as to be movable in a substantially vertical direction in relation to the main chassis or frame, whereby it may be rendered possible to adjust the floor or ground contact. The driving device may be pressed into contact with the supporting surface such that one or more of the supporting wheels or rollers is/are lifted out of engagement with the supporting surface. However, in order to secure a substantially uniform contacting load sufficient to transfer the necessary driving force without lifting the supporting wheels out of engagement with the floor surface, means may be provided for biasing the driving device in a direction away from the chassis or frame and towards the supporting surface, such as the floor or ground surface.

In a presently preferred embodiment the driving device is rotatably mounted on a supporting member, such as an arm or lever, which is pivotally mounted on the main frame or sub-frame about a substantially horizontal axis. The main frame or sub-frame and the supporting member may then advantageously be interconnected by a spring, such as a coil spring or gas spring. In this case at least one of the connecting points of the spring may be movable so as to change the biasing force of the spring applied to the driving device. In this manner the load carried by the driving device and thereby the maximum driving force obtainable may be adjusted in a simple manner. Alternatively, said biasing means for biasing the driving device may comprise hydraulic, pneumatic or magnetic means, such as hydraulic or pneumatic cylinders or electromagnets.

When the driving direction of the wheeled object has to be changed, the angular position of the driving device or the sub-frame on which it may be mounted may be changed by manual force. However according to the invention the wheeled object preferably further comprises power operated driving means to rotate the driving device or the sub-frame about said substantially vertical axis between predetermined angular positions. The angular position of the driving device may then be changed for example by actuating a man/machine interface of any suitable type, such as a joystick or a pressure sensitive switch.

In principle, any angular position may be chosen. However, for the sake of simplicity the said predetermined angular positions may comprise only a position corresponding to the usual driving direction and a position perpendicular thereto.

Said power operated driving means for rotating the driving device about a vertical axis may be separate from the driving motor for driving the driving device. In other embodiments, however, such power operated driving means utilize the driving motor for driving the driving device. In case the driving device comprises only one driving wheel or roller, the point of contact between the driving wheel and the supporting surface may be horizontally spaced from the intersection point between said substantially vertical axis and the supporting surface. Thus, if the intersection point is fixed in any suitable manner, for example by braking the wheeled object, and the driving wheel or roller is driven by its driving motor, the driving wheel is moved along a circular path around said intersection point, whereby its direction may be changed.

Alternatively, the driving device may comprise a support member for contacting the supporting surface at said intersection point when the driving wheel is in contact with the floor or ground surface. Thus, such support member may centre the driving device around the intersection point, so that that when driven by its driving motor the driving wheel or roller may roll along a circle having its centre coinciding with the intersection point. The support member may, for example, be a rod- or pin-like member. Preferably, however the support member is in the form of an idle wheel or roller which may be braked. As another possibility, the driving device may comprise an idle wheel or roller, which is contacting the support surface at a contact point horizontally spaced from the intersection point between said substantially vertical axis and the support surface, preferably by a distance being substantially equal to the spacing of the driving wheel or roller from said intersection point. Preferably, the idle wheel or roller is arranged opposite to and substantially co-axial with the driving wheel or roller. Thus, when the driving wheel or roller is driven by its driving motor the driving device will rotate around said intersection point, whereby the direction of the driving device may be changed into a desired direction.

Alternatively, the driving device may comprise a pair of axially spaced wheels having a common axis and both being driven by a common driving motor, and the contact points between the driving wheels are then preferably located closely adjacent to but spaced from the intersection between said substantially vertical axis and the floor surface.

In principle, the driving motor may be of any known type, such as an internal combustion engine or a pneumatic or a hydraulic motor. In the preferred embodiment, however, the driving motor is an electric motor, which may be connected to the driving wheel(s) or roller(s), either directly or by means of a chain, a belt, a gear transmission or a combination thereof. The operation of the motor may be controlled by conventional control means.

In a presently more preferred embodiment the driving device comprises a pair of driving wheels or rollers, which are arranged on opposite sides of and equally spaced from the intersection point between said substantially vertical axis and the supporting surface, and the driving wheels are interconnected via a differential gear. The driving motor may then rotate one of the driving wheels, whereby the differential gear causes the other driving wheel to rotate with the same rotational speed in the opposite direction. In this manner the driving device may be rotated about said vertical axis until it takes up the direction desired. The differential gear may comprise a differential lock, which may be moved to its locking position, when the driving device has been rotated to the desired angular position. Thereafter, both of said pair of driving wheels are driven in the direction chosen at the same rotational speed.

It is important that on the one hand the driving device is biased towards the supporting surface or floor surface by a force sufficient to avoid skidding of the driving wheel(s) or roller(s) when driven by the driving motor. However, on the other hand the biasing force applied to the driving device should not support the total weight of the wheeled object, so that the supporting wheels or rollers are lifted out of contact with the supporting surface or floor surface. In case the driving device comprises an idle wheel and a driving wheel, possible skidding of the driving wheel or roller may be detected by means measuring the rotational speeds of the driving wheel as well as of the idle wheel and means for comparing the rotational speed measured. If the speed of the driving wheel differs from that of the idle wheel this indicates slipping or skidding of the driving wheel and that the bias of the driving device towards the supporting surface should be increased.

In an alternative embodiment said biasing means are adapted to gradually increase the biasing force, and means are provided for determining the weight carried by the driving device, for detecting when the weight carried has reached a maximum, and for subsequently decreasing the biasing means by a predetermined value, respectively. Thereby it is secured that an almost maximum driving force is transferred to the wheeled object without lifting the supporting wheels or rollers out of contact with the supporting surface or floor surface.

The maximum friction forces needed between the driving wheel(s) and the supporting surfaces or floor surface depend i. a. on the weight or load of the wheeled vehicle. Therefore, in a simplified embodiment the vehicle may comprise manually actuate-able means for selecting one of a number of different levels of biasing force. These selectable biasing forces may be based on empirical values and include for example “empty”, “light load” and “heavy load”. Thus, the operator has to choose the right level of the biasing force.

In another possible embodiment, the wheeled object may comprise means for detecting the distance of the downward movement of the driving device under the influence of the force applied by the biasing means and for restricting said downward movement in response to the relationship between said downward movement and the biasing force of the biasing means. This embodiment is based on the fact that the initial increase in distance is due to resilient deformation of the wheel(s) of the driving device. Thus, if the increase in distance is plotted as a function of the biasing force, the said distance increases rather slowly at the beginning in response to an increasing biasing force. When, however, the resilient deformation of the driving device has been completed, and the wheel device carries more and more of the weight of the vehicle or wheeled object the biasing force increases more rapidly with an only slight increase in distance, and finally when the biasing force reaches a level, at which one or more of the supporting wheels or rollers is/are lifted out of contact with the supporting surface, the distance increases more rapidly with an only slight increase of the biasing force. In this case the biasing force should be maximised to a value just before any of the supporting wheels are lifted out of contact with the supporting surface.

According to a second aspect the present invention further relates to a driving assembly to be mounted on a wheeled object as described above, said assembly comprising biasing means for biasing the driving device into contact with the supporting surface and for controlling the biasing force, so as to secure sufficient friction between the driving device and the supporting surface and so as to maintain contact between the supporting wheels or rollers and the supporting surface. As explained above, said biasing means may be adapted to gradually increase the biasing force, and the driving assembly may further comprise means for determining the weight carried by the driving device, for detecting when weight carried has reached a maximum, and for subsequently decreasing the biasing force by a predetermined value. Alternatively, the driving device may further comprise means for detecting the distance of the downward movement of the driving device under the influence of the biasing means and for restricting said downward movement in response to the relationship between said downward movement and the biasing force of the biasing means.

According to a third aspect the present invention provides a method of biasing a motor driven driving device for driving a wheeled object of the type adapted to be operated by a walking person, the wheeled object comprising a main chassis or frame supported by a plurality of supporting wheels or rollers, which defines the vertices of a polygonal part of the supporting surface, towards said polygonal surface part, said method comprising moving the driving device into contact with said polygonal surface part, gradually increasing the biasing force applied to the driving device, monitoring the relationship between movement of the driving device towards the polygonal surface part and the biasing force applied, and selecting based on such relationship the biasing force to be used.

In a presently preferred embodiment the said method comprises gradually increasing the biasing force, monitoring the weight carried by the driving device, detecting when the weight carried has reached a maximum, and subsequently decreasing the biasing force by a predetermined value.

Alternatively, the said method comprises gradually increasing the biasing force, monitoring the distance of the downward movement of the driving device, restricting said downward movement in response to the relationship between said downward movement and the biasing force used.

BRIEF DESCRIPTION OF THE DRAWINGS

The invention will now be further described with reference to the enclosed diagrammatic drawings, wherein.

DESCRIPTION OF PREFERRED EMBODIMENTS

Figure 1:
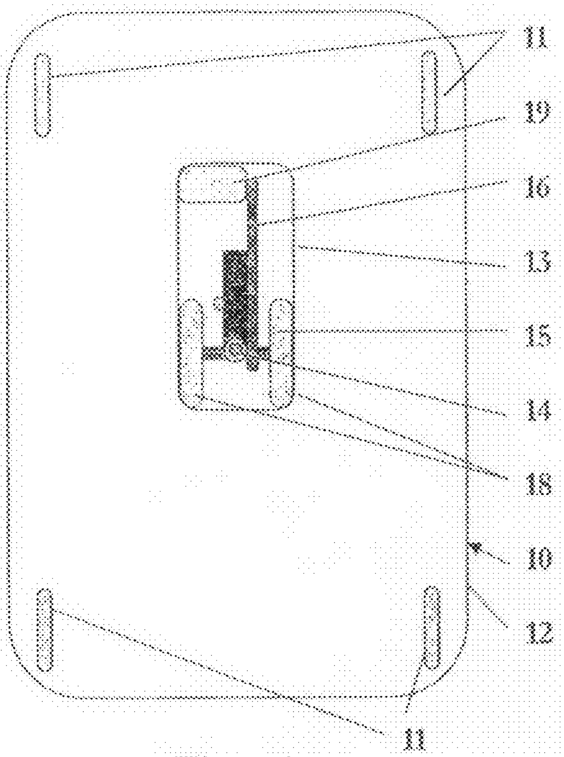
FIGS. 1 and 1*a* are diagrammatic plan views of a bed or another wheeled object according to the invention and of a control device for such bed, respectively.

In the drawings and the following description alike parts of the various embodiments are designated the same reference numbers.

Figure 2:
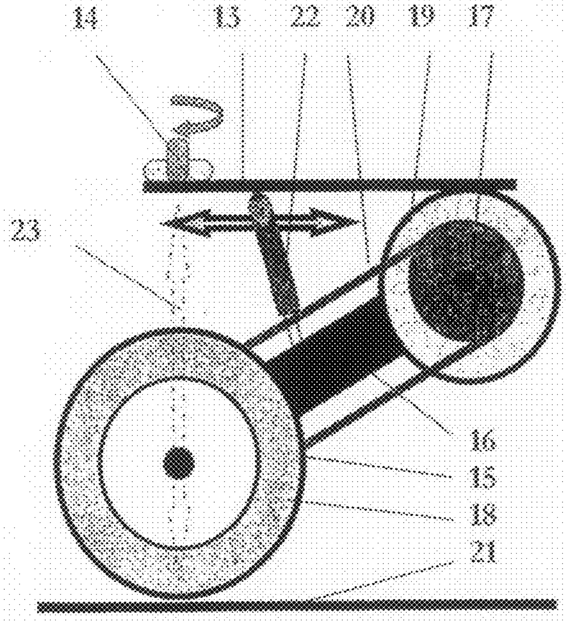
FIGS. 2 and 2*a* is a diagrammatic side view of a driving wheel arrangement for the wheeled object shown in FIG. 1, and a plan view of a control device for such arrangement, respectively.

A bed or another wheeled object or vehicle 10 is supported by a plurality, preferably three or four, supporting wheels or rollers 11 of the swiveling caster type. In the embodiment shown a wheel 11 is arranged at each corner of a rectangular chassis or frame 12 of the bed. As best shown in FIG. 2 a sub-frame 13 is mounted to the bottom surface of the chassis 12 so as to be rotatable about a substantially vertical axis 14. A driving wheel device or driving device 15 comprises a supporting arm 16, which at one of its ends is pivotally mounted on the sub-frame 13 about a substantially horizontal axis 17, and a pair of axially spaced wheels 18, which are rotatably mounted at the free end of the arm 16. Both of the wheels 18 may be driving wheels or one may be idle and the other may be driving.

The driving device 15 further comprises an electric driving motor 19, which is arranged on the > supporting arm 16 and drivingly connected to the driving wheel(s) 15 by means of a chain or belt drive 20. Alternatively, the motor may directly or via a gear device be connected to the shaft(s) of the drive wheel(s) 18. The supporting arm 16 is biased downwardly towards a floor or ground surface 20 by means of a spring or another biasing member, such as an adjustable gas spring 22. Thus, the wheels 18 are movable in a substantially vertical direction and substantially along the vertical axis 14 as indicated by an arrow 23, FIG. 2. Furthermore, the axis 14 is preferably positioned at or adjacent to the centre of the polygonal supporting surface (a rectangle in the drawings) defined by the supporting wheels 11.

The compression spring or biasing member 22 may be of any known type, and by shifting the attachment point of the spring to the chassis or frame 12 or the sub-frame 13 or both away from or towards the wheels 18, the engagement pressure of the driving wheel(s) against the floor surface 21 may be adjusted as explained in more detail below with reference to FIG. 13. This adjustment possibility is essential in order to prevent the bed or wheeled object 10 from being elevated by such spring bias when, empty or unloaded, whereby stability of the bed may be ensured. On the other hand the driving wheels of a bed with a heavy patient or a heavily loaded moving wheeled object may be given the necessary engagement pressure for successful powered traction. Shifting of one or both attachment points of the spring 22 can be obtained by use of an actuator of known type. By suitable arrangement of the travel of one of the attachment points it is also possible to lift the driving wheel(s) 18 away from the floor surface 21 or reduce the engagement force to zero for free manual movement of the vehicle. Various principles of rotating the driving device 15 about the vertical axis 14 and for controlling the force, by which the driving_wheel 18 is/are biased towards the supporting surface 21, are described below.

Figure 1A:
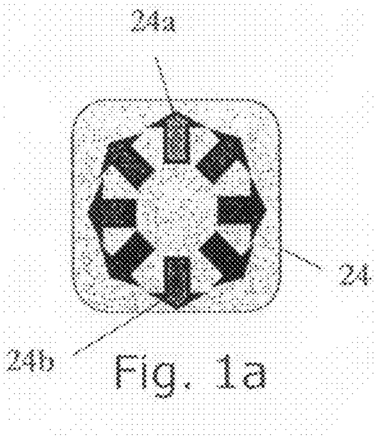
Figure 2A:
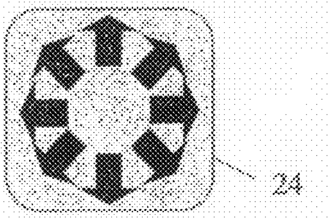

In FIG. 1 the supporting wheels 11 as well as the driving wheels 18 are parallel with the longitudinal direction of the bed or chassis 12, and the bed may be moved in its opposite longitudinal directions, when the driving motor 19 is energised and caused to move in one direction or the other. The motor 19 and the angular position of the sub-frame 13 and of the driving wheels 18 mounted thereon may be operated by means of a control device or a pressure sensitive man/machine interface 24 illustrated in FIGS. 1*a* and 2*a*. Thus, pushing the buttons 24*a* and 24*b* (FIG. 1*a*) causes the driving device 15 to drive the bed forwards and backwards, respectively, in the longitudinal direction.

Figure 3:
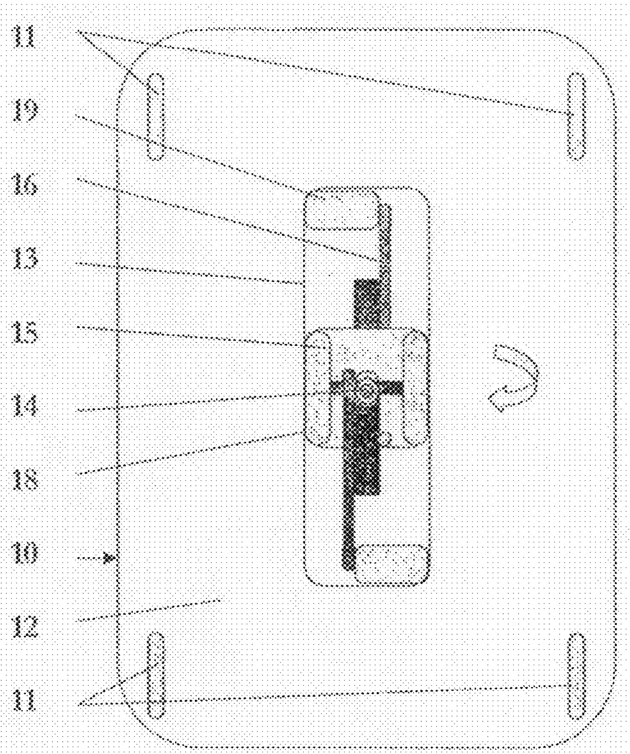
FIGS. 3-5*a* are plan views corresponding to those in FIGS. 1 and 1*a*, the drive wheel arrangement being shown in different positions.
Figure 4:
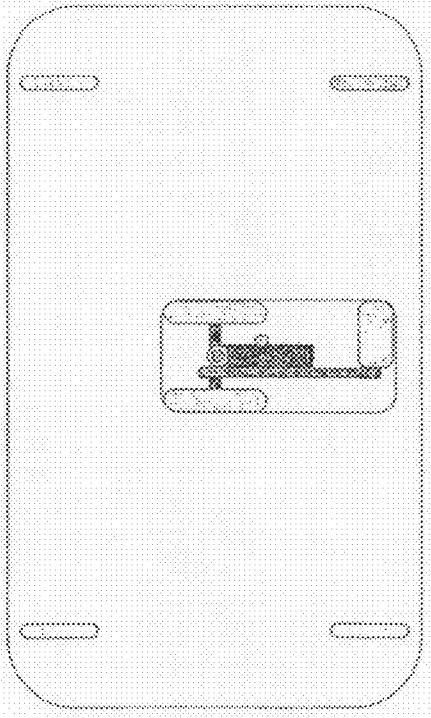
Figure 4A:
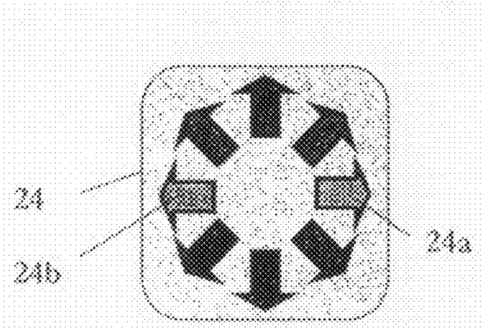

As illustrated in FIGS. 3 and 4 the sub-frame 13 and the driving wheel(s) 18 mounted thereon may be rotated 90° by actuating the control device 24 (FIG. 4*a*) correspondingly, i.e. pushing any of the buttons 24*a* and 24*b*, whereby the bed or vehicle 10 may be moved in an athwart direction when the driving motor 19 is energised. The rotation of the sub-frame 13 can be achieved by use of an actuator or electric motor (not shown) in conjunction with suitable limit switches in known manner or by other means obvious to skilled persons.

The possible angular positions of the sub-frame 13 is not limited to the angular positions illustrated in FIGS. 3 and 4, namely a longitudinal direction and a direction perpendicular thereto, even though the choice between such two predetermined angular positions might suffice to obtain motion in any direction through successive application. However, as indicated in FIGS. 1*a*, 2*a*, 4*a* and 5*a* the control device 24 preferably allows for choosing between a greater plurality (eight in the embodiment shown) of predetermined driving directions. It is also envisaged that the driving direction may be chosen infinitely variable over full 360°.

By monitoring the rotational speed of the motor 19 and the driving wheel(s) 18 together with the delivered torque, as obtained from the armature current in the case of an electric motor, possible wheel spin through lack of engagement force can be observed, and subsequently used as a command for shifting the attachment point of the spring 22 to increase the engagement force.

Figure 5:
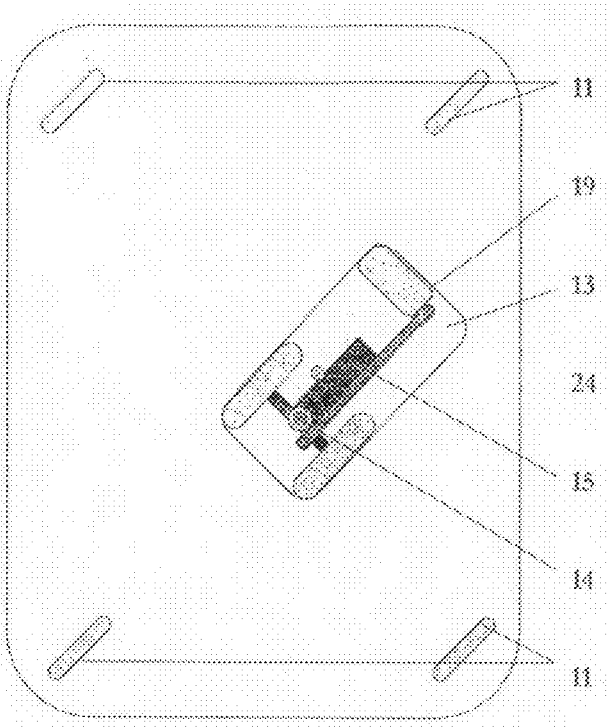
Figure 5A:
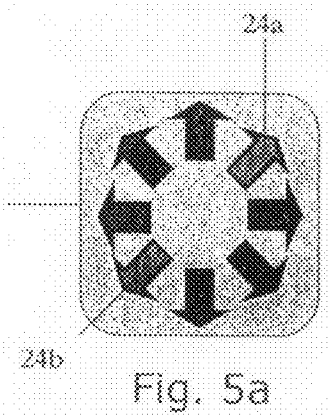

As indicated above, the control device 24 may comprise a large number of predetermined angular positions of the sub-frame 13 in the form of push-buttons, and the sub-frame may be caused to take up an angular position corresponding to the push-button being depressed, and when the driving motor 16 is energised the bed or chassis 11 will be moved in the direction selected. The driving speed may be controlled in any suitable known manner. Thus, it may be one fixed setting, or the speed may increase with a pressure applied to a handgrip and vice versa. Alternatively, the speed may increase with the time of pressing and possibly incorporate acceleration and deceleration functions. FIG. 5 illustrates a situation where the sub-frame has been rotated to an angular position defining an angle of 45° with the longitudinal direction of the bed 10 by pushing any of the buttons 24*a* and 24*b* (FIG. 5*a*).

Figure 6A:
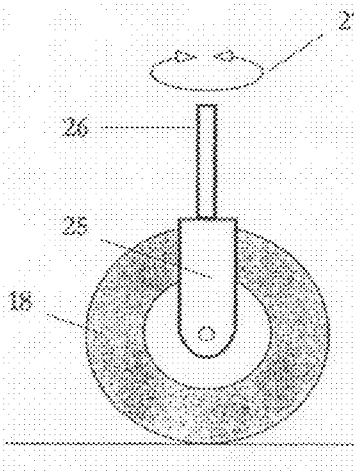
FIGS. 6*a* and 6*b* are side and front views, respectively, of a first embodiment of a drive wheel device.

FIGS. 6*a*-10*b* illustrate various principles for rotating the sub-frame 13 or the driving device 15 about a vertical axis 14 in order to select the desired driving direction. FIGS. 6*a* and 6*b* show a simple driving wheel 18 which directly or via a transmission or gear (not shown) is driven by an electric driving motor 19. The driving wheel 18 is rotatably mounted in a fork-shaped member 25 arranged at the lower end of a steering shaft 26 with a vertical axis 14, which intersects the ground or floor surface 21 at a point 28 coinciding with the contact point of the wheel 18. The steering shaft 26 may be rotated by a separate steering motor, not shown, as indicated by arrows 27.

Figure 6B:
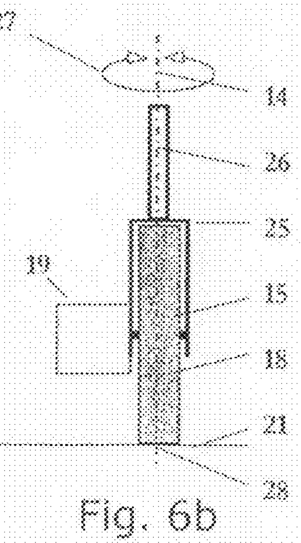
Figure 7A:
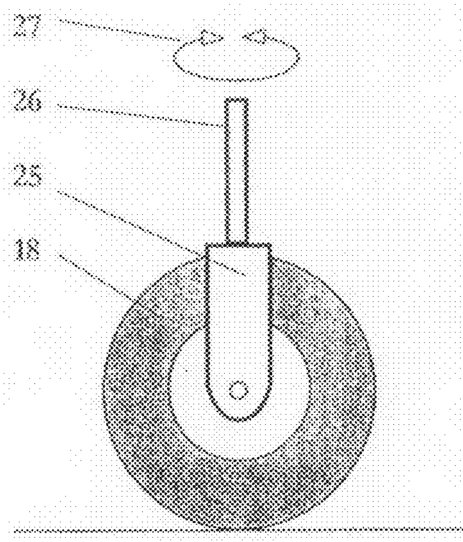
FIGS. 7*a* and 7*b* are side and front views, respectively, of a second embodiment of the drive wheel device.
Figure 7B:
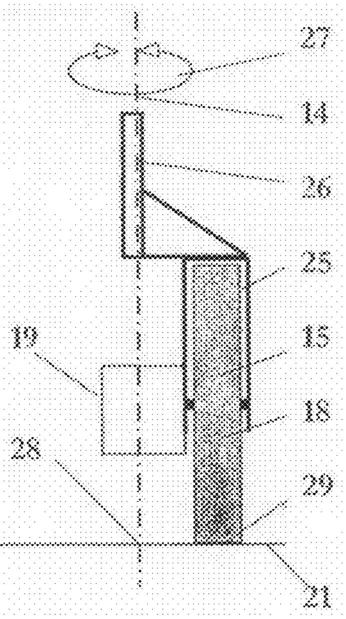

The driving device 15 illustrated in FIGS. 7*a* and 7*b* differs from that shown in FIGS. 6*a* and 6*b* in that the motor 19 may be used not only for driving the driving wheel 18, but also for rotating the steering shaft. As best shown in FIG. 7*b* the vertical axis 14 of the steering shaft 26 intersects the floor surface 21 at an intersection point 28, which is horizontally spaced from the point 29, in which the driving wheel 18 contacts the ground or floor surface 21. It is understood that if the bed or vehicle 10 is braked, for example by braking one or more of the supporting wheels or rollers 11, and the steering shaft 26 may rotate freely, the angular position of the driving wheel 18 may be changed by driving the wheel 18 by means of the driving motor 19. Rotation of the wheel 18 causes the wheel to run along a circular path having the intersection point 28 as its centre and the spacing between the points 28 and 29 as its radius. When the driving wheel 18 has reached the selected angular position, the shaft 26 may be locked in that position.

Figure 8:
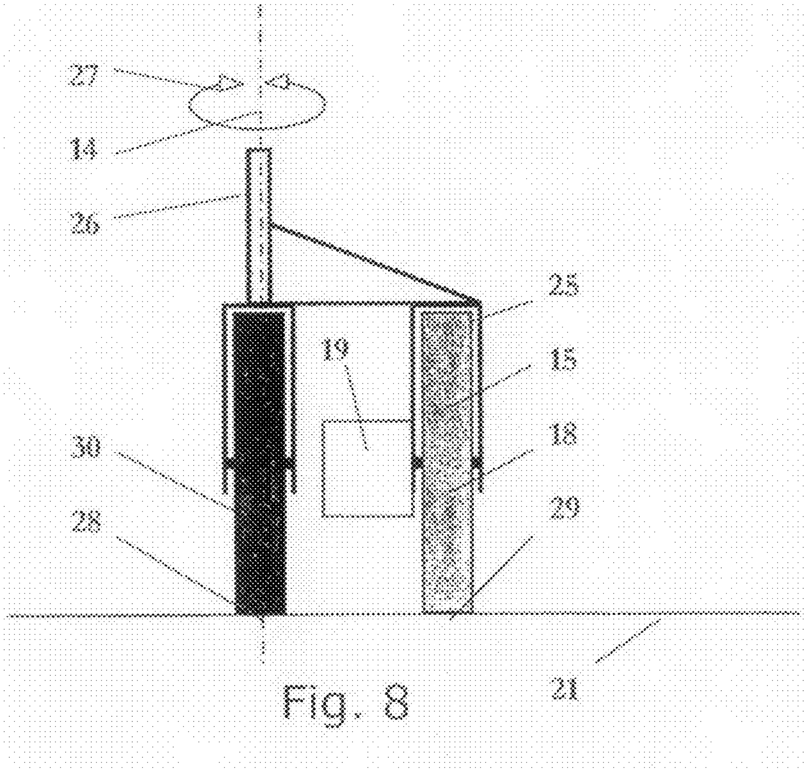
FIG. 8 is a front view of a third embodiment of the drive wheel device, FIG. 9 a front view of a fourth embodiment of the drive wheel device.

The driving device 15 shown in FIG. 8 comprises a pair of axially spaced, coaxial wheels of which one is a driving wheel 18, and the other is an idle wheel 30. The floor contact point 28 of the idle wheel 30 is coinciding with the intersection point of the vertical axis 14 and the floor or ground surface 21. When the angular position of the driving device 15 is to be changed the idle wheel is braked and the driving wheel 15 is rotated by activating the electric motor 19. Then the contact point 28 of the braked idle wheel 30 serves as a turning point or as a centre of the circular travelling path of the driving wheel 18. When the selected angular position of the driving device 15 has been obtained, the steering shaft 26 may be retained or locked in that position while the brake of the idle wheel is released. The driving wheel 18 may now again be rotated by the driving motor 19, whereby the bed or vehicle 10 is moved in the desired direction.

Figure 9:
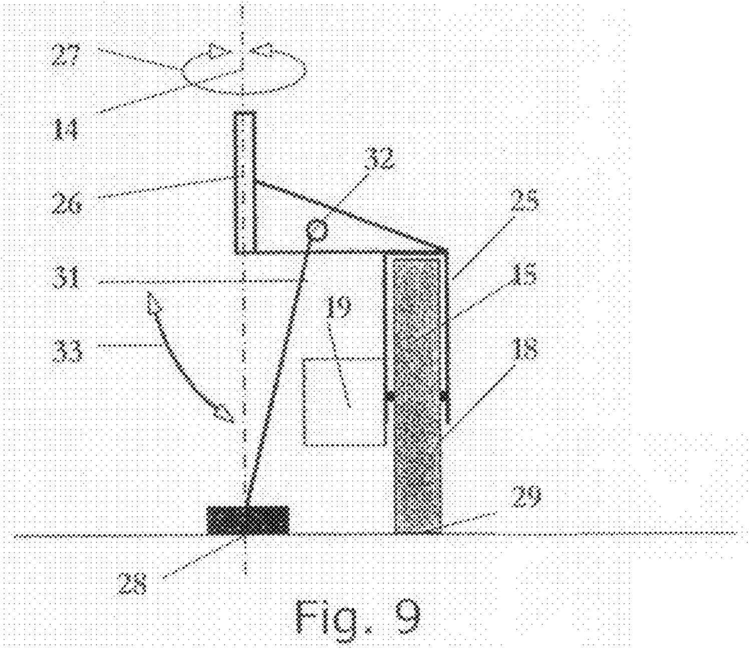

The embodiment illustrated in FIG. 9 operates in a manner similar to that of FIG. 8. However, in FIG. 9 the idle wheel 30 has been replaced by a support arm or member 31, which is connected to the steering shaft 26 via a pivot point 32. During normal driving operation of the bed 10 the support member is rotated into an inoperative position (not shown), in which it is out of engagement with the floor or ground surface 21. When, however, the driving direction is to be changed, the support member 31 is moved into its operative supporting position shown in FIG. 9, in which the lower end of the member 31 is in engagement with the floor or ground surface 21 at the intersection point 28 with the vertical axis 14. When the driving wheel 18 is rotated by the motor 19, the whole driving device 15 is rotated around the vertical axis 14 until the selected new angular position has been obtained. Thereafter the support member 31 is tilted into its inoperative position. When the motor 19 is energised the driving device 15 will drive the bed or vehicle 10 in the new direction selected, for example by means of the control device 24 or any other kind of man-machine interface.

Figures 10A, 10B:
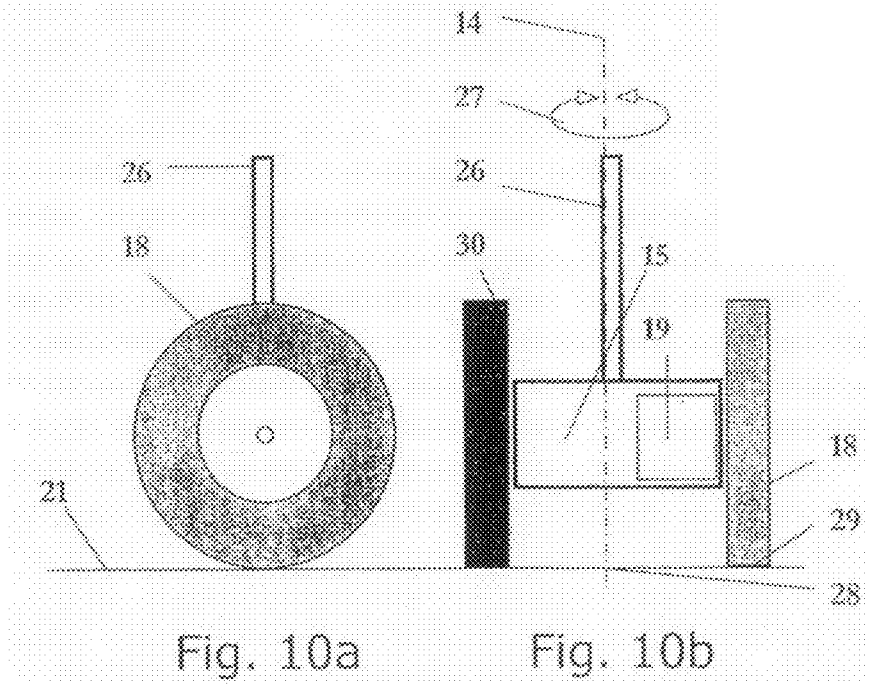
FIGS. 10*a* and 10*b* are side and front views, respectively, of a fifth embodiment of the drive wheel device.

FIGS. 10*a* and 10*b* illustrate en embodiment comprising a pair of coaxial wheels or rollers including a driving wheel 18 and an idle wheel 30 like the embodiment shown in FIG. 8. In FIGS. 10*a* and 10*b*, however, the wheels 18 and 30 are equally spaced from the vertical axis 14 of the steering shaft 26, and the steering movements of the driving device 15 are generated by a separate steering motor (not shown), which is connected to the steering shaft 26 so as to change the angular position of the wheels 18 and 30 as desired when operated.

As mentioned above it is important that the driving wheel(s) 18 is/are pressed into firm engagement with the floor or ground surface 21 so as to obtain friction forces between the driving wheel(s) 18 and the floor or ground surface 21 sufficient to obtain the driving forces necessary to drive the bed or vehicle 10. On the other hand, however, the forces at which the driving wheel(s) is/are pressed into engagement with the supporting surface 21 should be less than the total weight of the bed or vehicle being driven so that the supporting wheels or rollers are kept in contact with the supporting surface 21.

Figure 11A:
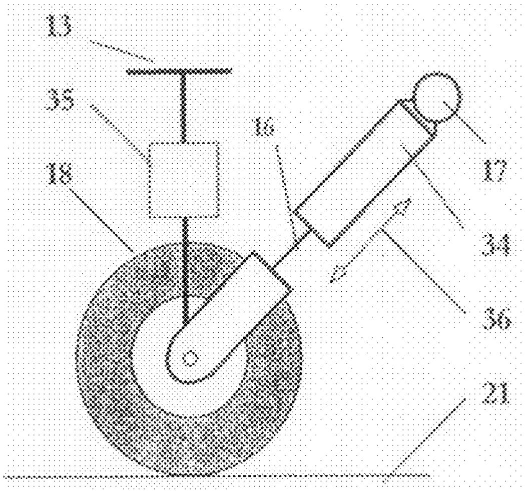
FIGS. 11*a* and 11*b* is a side view of a sixth embodiment of the drive wheel device and a graph illustrating the function thereof, respectively.
Figure 11B:
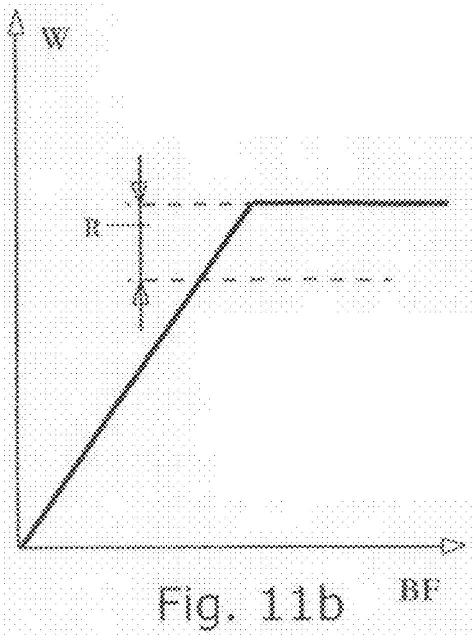

FIGS. 11*a* and 11*b* illustrate an embodiment in which the driving wheel 18 is rotatably mounted at the free end of a supporting arm 16, which is movable about a horizontal axis or a pivot point 17. The arm 16 may include an adjustable biasing member 34, such as a gas spring or a pneumatic or hydraulic cylinder, for biasing the driving wheel 18 towards the supporting surface 21. A weighing cell 35 or a similar weight detecting device is interconnected between the bed main frame or sub-frame 13 and the driving wheel 18 such that the weighing cell may measure the weight carried by the driving wheel 18. As indicated by an arrow 36 the force by which the driving wheel is biased towards the supporting surface may be varied.

In FIG. 11*b* the weight W carried by the driving wheel 18 as measured by the weighing cell 35 has been plotted as a function of the biasing force BF exerted by the biasing member 34. It is apparent that the weight W carried by the driving wheel 18 increases proportionally with the biasing force BF of the biasing member 34 till a maximum weight has been reached indicating that the supporting wheels or rollers 11 are being lifted out of engagement with the floor surface 21. This means that the biasing force BF generated by the biasing member should preferably be controlled so as to be within a range R indicated in FIG. 11*b*.

It should be understood that, alternatively, the biasing member 34 could be interconnected between the weighing cell 35 and the driving wheel 18 or the frame 13. As another alternative a weighing cell or weighing cells could support bearings of the driving wheel 18 in an embodiment as that shown in FIG. 2.

Figure 12:
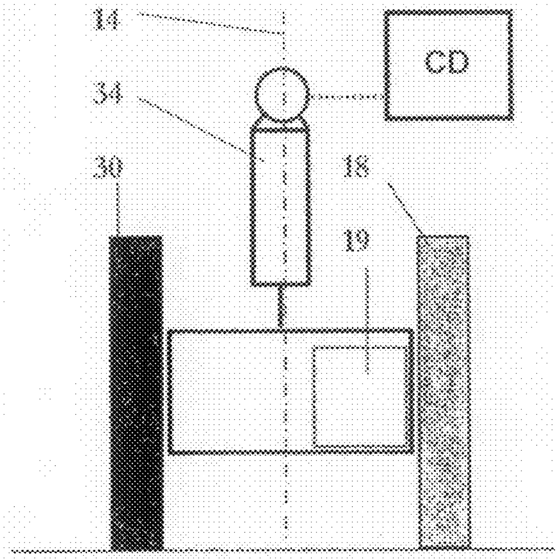
FIG. 12 is a front view of a seventh embodiment of the drive wheel device.

The embodiment shown in FIG. 12 corresponds to that shown in FIGS. 10*a* and 10*b*. However in FIG. 12 the driving wheel 18 is biased towards the supporting surface 21 by means of a biasing member 34 of a type as previously described. As an example, the biasing force of the biasing member 34 may be selected among a minor number of fixed settings, such as “empty”, “light load” and “heavy load”, by means of the man/machine interface. Alternatively, the rotational speeds of the idle wheel 30 and the driving wheel 18, respectively, may be currently detected by suitable speed detecting means (not shown), and these speeds may be compared by an electronic control device CD. In case the detected speed of the driving wheel 18 differs from that of the idle wheel 30 wheel this indicates that the driving wheel 18 is skidding, and that the biasing force of the biasing member should be increased. Based on this principle the biasing force can be controlled automatically by the electronic control device CD in response to measuring signals indicating the rotational speeds of the wheels 18 and 30.

Figure 13:
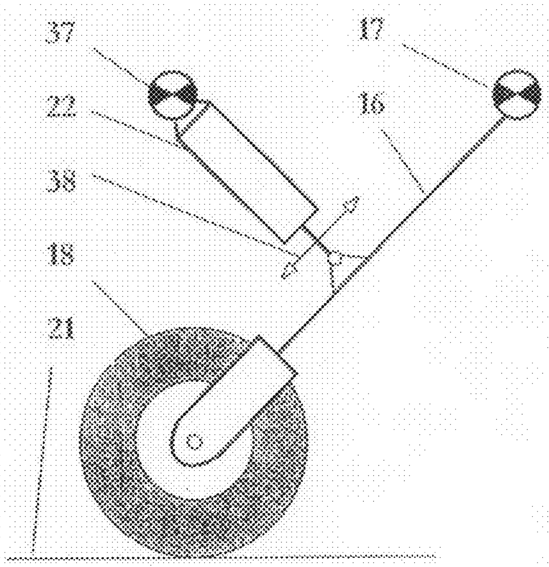
FIG. 13 is a side view of an eighth embodiment of the drive wheel device.

FIG. 13 illustrates one method for continuously varying the force at which the driving wheel(s) 18 is/are biased towards the supporting surface 21, for example by means of a compression spring, such as a gas spring 22. The spring is pivotally mounted at one end at a pivot point 37, while the other end of the gas spring 22 is slidably connected to a wheel supporting arm 16 as indicated by an arrow 38. The driving wheel 18 is mounted at one end of the arm 16, and the opposite end of the arm, which extends transversely to the direction of the gas spring 22, is pivotally mounted at a pivot point 17.

Figure 14A:
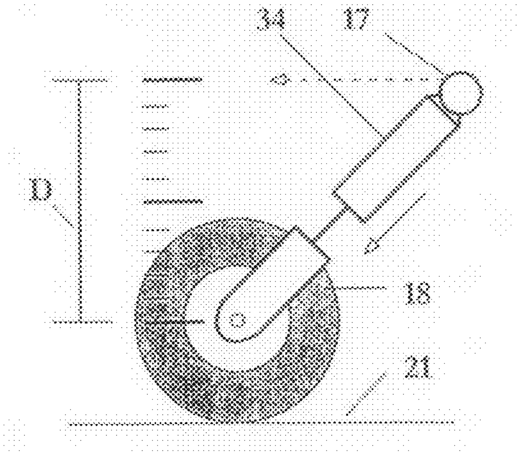
FIGS. 14*a* and 14*b* is a side view of a ninth embodiment of the drive wheel device and a graph illustrating the function thereof, respectively.

The driving and idle wheels comprised by the driving device 15 usually include a thread or running surface formed by a resilient material. Therefore, as indicated in FIG. 14*a* the driving device 15 may comprise means (indicated by D in FIG. 14*a*) for detecting the distance of the downward movement of the driving device 15 under the influence of the force applied by a biasing member 34.

Figure 14B:
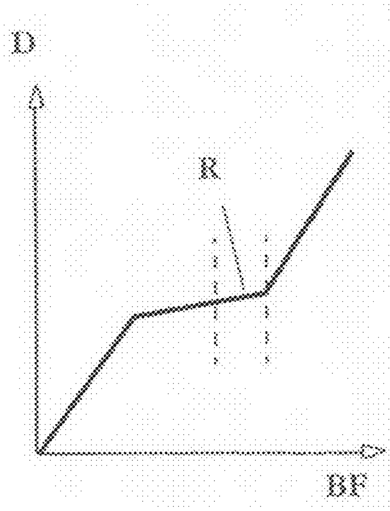

FIG. 14*b* shows a graph in which the said distance D has been plotted as a function of the biasing force BF generated by the member 34. As seen from the graph the distance D increases proportionally with the biasing force BF as long as part of the driving wheel 15 is compressed resiliently. Thereafter the graph flattens out, which indicates that the wheel takes up load without any substantial further compression. When the biasing force is increased further the distance starts increasing again, which indicates that the supporting wheels 11 of the bed or vehicle is being lifted from the ground or floor surface 21. Therefore, the biasing force is preferably chosen so as to be within a range R indicated in FIG. 14*b*.

Figure 15:
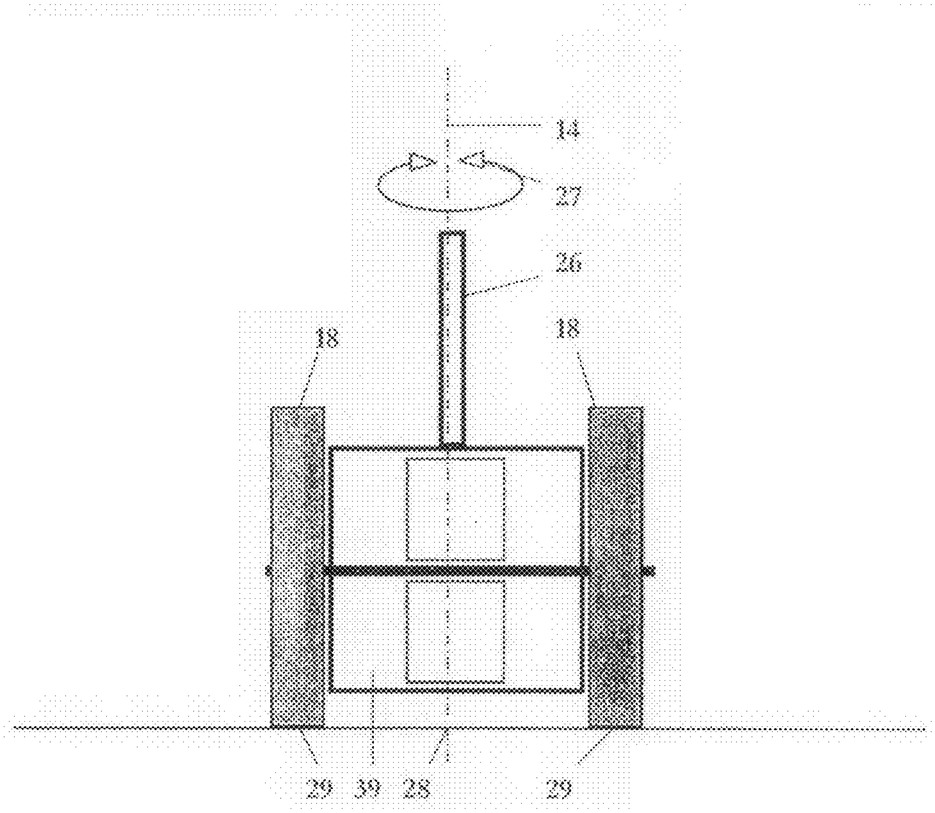
FIG. 15 is a front view of a tenth embodiment of the drive wheel device.
Figure 16A:
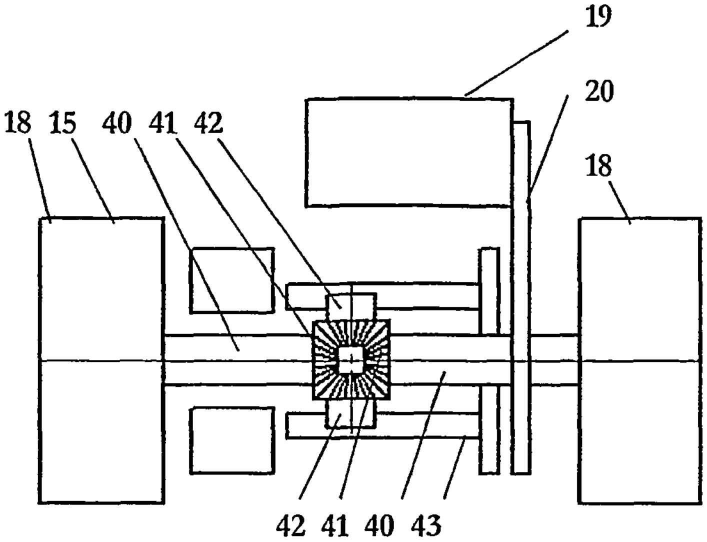
FIGS. 16*a* and 16*b* are diagrammatic plan views of a drive wheel device including a differential gear mechanism in a locked and a non-locked position, respectively.
Figure 16B:
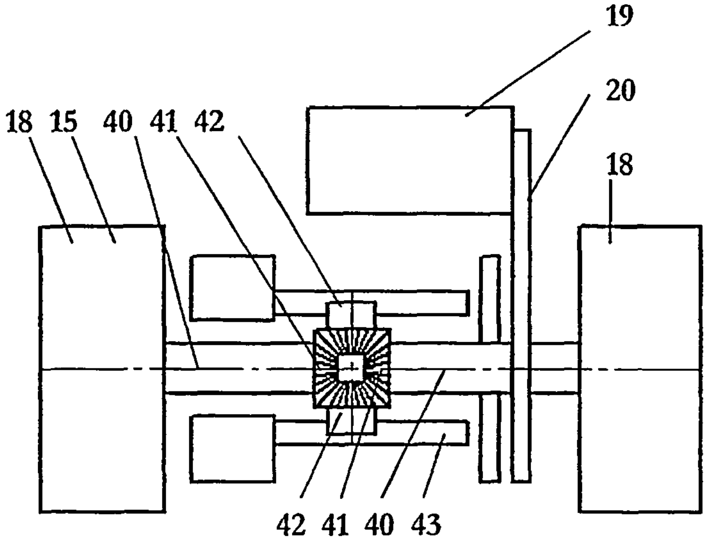

As described above, FIGS. 6*a*-10*b* illustrate various principles for rotating the sub-frame 13 or the driving device 15 about a vertical axis 14. A further embodiment is shown in FIGS. 15, 16*a* and 16*b*. In the embodiment shown in FIG. 15 the driving device 15 comprises a pair of similar driving wheels 18 arranged symmetrically about the vertical axis 14. These driving wheels 18 are drivingly interconnected by a differential gear 39, which is illustrated more in detail in FIGS. 16*a* and 16*b*.

As shown in FIGS. 16*a* and 16*b* the driving wheels 18 are mounted on aligned, oppositely directed, rotatably mounted shafts 40. A pair of pinions 41 are mounted on the opposite free ends of the shafts, and the pinions 41 are engaging with a pair of idle bevelled gears 42 so that the shafts 40 are drivingly interconnected. The driving motor 19 is connected to one of the shafts 40 by means of a chain or belt drive 20. According to the well-known function of a differential gear this means that when the motor 19 is operated the driving wheels 18 are rotated in opposite directions so that the driving device 15 is rotated around the vertical axis 14 till the angular position selected, e.g. by means of the control device 24, has been obtained. When the driving device has been locked in the selected angular position, a differential lock 43 is activated so that the shafts 40 are interconnected (FIG. 16*a*), and the bed or vehicle 10 may be driven in the selected direction by both of the driving wheels 18 when the motor 19 is energised. In FIG. 16*a* the differential lock is shown in its locked position and in FIG. 16*b* the differential lock 43 is in its non-locking position.

It should be understood that the invention is not limited to the embodiments described above by way of examples, but is defined by the appended claims. Thus, any of the embodiments described above with reference to the drawings may be modified and combined in various manners as clearly understood by those skilled in the art. As an example any of the various principles of changing the angular position of the driving device 15 in order to steer the bed or vehicle may be combined with any of the described principles of biasing the driving wheel(s) towards the floor or ground surface. Furthermore, the man/machine interface need not be a push button device 34 as shown, but could be of any other type and could include for example strain gauge devices in handles, foot rails etc., knobs, joy sticks or any other known activating devices.

The invention claimed is:

1. A wheeled object of the type adapted to be operated by a walking person and comprising:

a main frame supported by a plurality of supporting wheels or rollers;

a motor driven driving device comprising at least one driving wheel or roller engageable with a supporting surface for driving the wheeled object, the driving device being mounted so as to be rotatable about a substantially vertical axis in relation to the main frame so as to change an angular position and a driving direction of the driving device in relation to the main frame, said driving device being mounted on at least one supporting arm pivotably or rotatably mounted on the main frame or on a subframe about a common, substantially horizontal first axis so as to allow the driving device to move up and down around a single horizontal axis, the single horizontal axis being said first horizontal axis; and means for biasing the driving device in a direction away from the main frame and towards the supporting surface, wherein an axis of a motor driven driving shaft for driving the driving device coincides with said first axis.

2. A wheeled object according to claim 1, wherein the main frame or sub-frame and the supporting arm are interconnected by a spring, such as a coil spring or gas spring, defining said means for biasing.

3. A wheeled object according to claim 2, wherein at least one of the connecting points of the spring is displaceable so as to change a biasing force of the spring applied to the driving device.

4. A wheeled object according to claim 1, further comprising power operated driving means to rotate the driving device about said substantially vertical axis between predetermined angular positions.

5. A wheeled object according to claim 4, wherein said power operated driving means are separate from a driving motor for driving the driving device.

6. A wheeled object according to claim 4, wherein said power operated driving means include a driving motor for driving the driving device.

7. A wheeled object according to claim 1, wherein the driving device comprises a pair of driving wheels or rollers arranged on opposite sides of and equally spaced from an intersection point between said substantially vertical axis and the supporting surface, said driving wheels being interconnected via a differential gear.

8. A wheeled object according to claim 4, wherein said predetermined angular positions comprise a position corresponding to a usual driving direction and a position perpendicular thereto.

9. A wheeled object according to claim 1, wherein said biasing means are adapted to gradually increase a biasing force, further comprising means for simultaneously determining a weight carried by the driving device, for detecting when the weight carried has reached a maximum, and for subsequently decreasing the biasing force by a predetermined value.

10. A wheeled object according to claim 1, further comprising manually actuate-able means for selecting one of a plurality of different levels of biasing force.

11. A wheeled object according to claim 1, wherein said biasing means is adapted to gradually increase a biasing force, further comprising means for detecting a distance of a downward movement of the driving device under an influence of the biasing means and for restricting said downward movement in response to a relationship between said downward movement and the biasing force of the biasing means.

12. A wheeled object according to claim 1, wherein said at least one driving wheel or roller is/are rotatable about a common second axis being parallel with and spaced from said first axis at a fixed distance.

13. A wheeled object according to claim 1, wherein the driving device and a corresponding driving motor for driving the same are arranged on a common sub-frame, which is rotatable about said substantially vertical axis in relation to the main frame.

14. A wheeled object according to claim 1, wherein the driving shaft is connected to the at least one driving wheel by means of a chain or belt.

15. A wheeled object of the type adapted to be operated by a walking person, comprising:

a main frame supported by a plurality of supporting wheels or rollers;

a motor driven driving device engageable with a supporting surface for driving the wheeled object, the driving device being movable in a substantially vertical direction in relation to the frame and rotatable about a substantially vertical axis in relation to the frame so as to change an angular position and a driving direction of the driving device in relation to the frame, the driving device being mounted on at least one supporting arm pivotably or rotatably mounted on the main frame or on a subframe about a common, substantially horizontal first axis so as to allow the driving device to move up and down around the axis;

biasing means for biasing the driving device in a direction away from the frame and towards the supporting surface;

means for gradually increasing a biasing force applied to the driving device while in contact with said part of the supporting surface;

monitoring means for simultaneously monitoring a relationship between movement of the driving device away from the frame towards the supporting surface and the biasing force applied to the driving device; and selecting means for selecting, based on such relationship, an optimum biasing force so as to obtain sufficient friction between the driving device and said part of the supporting surface while maintaining contact between the supporting wheels or rollers and said supporting surface, and for subsequently using such optimum biasing force for biasing the driving device while the motor driven driving device is operated so as to drive the wheeled object.

16. A wheeled object according to claim 15, wherein the monitoring means comprise weighing means for monitoring a weight carried by the driving device and the selecting means comprises detecting means for detecting when the weight carried by the driving device has reached a maximum, the selecting means being adapted to select the optimum biasing force by decreasing such maximum weight by a predetermined value.

17. A wheeled object according to claim 15, wherein the monitoring means are configured to detect when the movement of the driving device as a function of the biasing force indicates that the biasing force has reached such a level that it starts elevating the frame in relation to the supporting surface, the selecting means being adapted to select the optimum biasing force by subsequently reducing such biasing force level by a predetermined value.

18. A wheeled object according to claim 15, wherein the frame and the vertically movable driving device are interconnected by a spring, such as a coil spring or gas spring, defining said biasing means and extending between a pair of connecting points, means being provided for displacing at least one of the connecting points of the spring so as to change the biasing force of the spring applied to the driving device by the spring.

19. A wheeled object according to claim 15, wherein an axis of a motor driven driving shaft for driving the driving device coincides with said first axis.

* * * * *